United States Patent Office 3,784,632
Patented Jan. 8, 1974

3,784,632
2,6-BIS(THIOUREA) DERIVATIVES OF PYRIDINE
Ikuo Matsumoto and Masao Okazawa, Tokyo, Japan, assignors to Banyu Pharmaceutical Co., Ltd., and Hiroyoshi Hidaka, both of Tokyo, Japan
No Drawing. Filed May 19, 1972, Ser. No. 254,941
Claims priority, application Japan, July 1, 1971, 46/47,700
Int. Cl. C07d *31/50*
U.S. Cl. 260—293.69                                    6 Claims

ABSTRACT OF THE DISCLOSURE

Pyridyl thiourea derivatives having the formula:

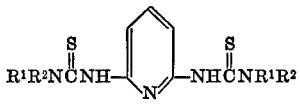

wherein $R^1$ and $R^2$, respectively, represent a hydrogen atom, a lower alkyl group or an hydroxyalkyl group or $R^1$ and $R^2$ together can form a heterocyclic ring with the nitrogen atom, can be prepared by reacting bis(alkyldithiocarbamate) derivatives having the formula:

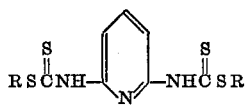

wherein R represents a lower alkyl group, with an ammonium hydroxide or amine having the formula:

wherein $R^1$ and $R^2$ are as defined above. Alternatively, the compounds can be prepared by reacting 2,6-di(isothiocyanato)pyridine with a dialkylamine of the formula:

wherein $R^1$ and $R^2$ are as defined above.

The compounds of this invention may be used as agents having physiological activity toward the circulatory system, or as anti-inflammation agents.

BACKGROUND OF THE INVENTION

Field of the invention

This invention relates to novel pyridyl thiourea derivatives and to methods of preparing same which are useful as agents having physiological activity toward the circulatory system and as anti-inflammation agents.

SUMMARY OF THE INVENTION

It is one object of this invention to provide novel pyridyl thiourea derivatives.

It is another object of this invention to provide a process for preparing pyridyl thiourea derivatives.

It is a further object of this invention to provide a new use for pyridyl thiourea derivatives as agents having physiological activity toward the circulatory system, and as anti-inflammation agents.

A still further object of this invention is to provide a reaction intermediate which may be used in the preparation of said novel compounds.

These and other objects, as will hereinafter become more readily understood, have been attained by the discovery of pyridyl thiourea derivatives of the formula:

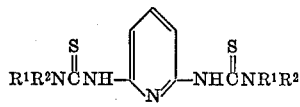

(I)

wherein $R^1$ and $R^2$, respectively, represent a hydrogen atom, a lower alkyl group or a hydroxyalkyl group or $R^1$ and $R^2$ taken together may form a heterocyclic ring with the nitrogen atom.

DETAILED DESCRIPTION OF THE PREFERRED EMBODIMENTS

The pyridyl thiourea derivatives of this invention can be prepared by reacting a bis(alkyl-dithiocarbamate) derivative having the formula:

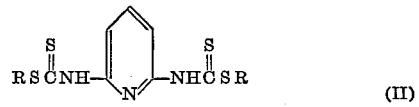

(II)

wherein R represents a lower alkyl group, with ammonia or an amine having the formula:

(III)

wherein $R^1$ and $R^2$, respectively, represents a hydrogen atom, a lower alkyl group or hydroxyalkyl group or $R^1$ and $R^2$ taken together may form a heterocyclic ring with the nitrogen atom.

The reaction can be shown by the following formula:

Compound (II)+2 Compound (III)→
                Compound (I)+2 RSH

In general, the Compound I can be obtained by heating a mixture of the Compound II with more than 2 equivalents of the Compound III for a short period of time to obtain high yields. If a strong basic compound of the Formula III is used, the reaction can be carried out in good yields, even at room temperature.

In accordance with this invention, a compound having the Formula II can be prepared by reacting 2,6-diaminopyridine with carbon bisulfide and a base (alkali) to yield a bis(dithiocarbamate) derivative and then reacting the product with an alkylating agent to achieve S-alkylation. Typical bases which may be used in this process include triethylamine, ammonium, hydroxide, sodium amide or potassium hydroxide, etc.

The reaction can be shown as follows:

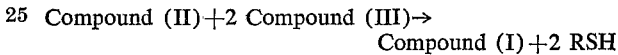

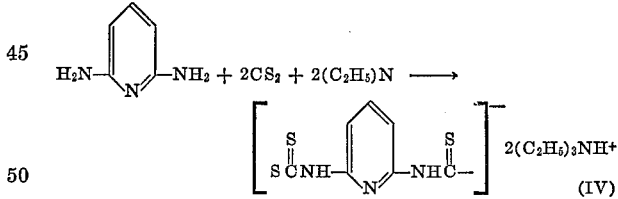

(IV)

When the compound IV is reacted with an alkylating agent such as methyliodide, ethylbromide, dimethyl sulfate or alkyl p-toluenesulfonate, the S-alkylation can easily be carried out to yield a bis(alkyldithiocarbamate) derivative having the Formula II. A solvent may be used as the reaction medium, although it is not strictly necessary. It is possible to effect the reaction after dilution with an alcohol type solvent or an aqueous solvent.

The aminolysis reaction can be conducted at room temperature. However, in general, the reaction will proceed with greatest efficiency by heating to 40–120° C.

As an alternative method, the pyridyl thiourea derivative of this invention can also be prepared by reacting 2,6-di(isothiocyanato) pyridine having the formula:

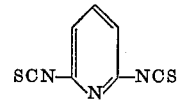

with a dialkylamine having the formula:

wherein R¹ and R² are as defined above. It is most preferable that R¹ and R² in the above formula each be a lower alkyl group, such as methyl, ethyl or propyl.

The reactant used in this process, 2,6-di(isothiocyanato) pyridine, is a novel compound which can be easily prepared from 2-aminopyridine through triethylamine 2-pyridyl dithiocarbamate by contact with phosgene. 2,6-di-(isothiocyanato) pyridine is stable in water, but is easily reacted with an amine to yield a thiourea derivative.

Accordingly, the reaction of 2,6-di(isothiocyanato)pyridine with dimethylamine can be conducted at room temperature in an aqueous solvent. The resulting thiourea derivative can be easily purified by conventional recrystallization methods. For example, since the thiourea derivative is water insoluble, it can be precipitated from a reaction solution and the product filtered and recrystallized from methanol for purification.

Having generally described the invention, a more complete understanding can be attained by reference to certain specific examples which are provided herein for purposes of illustration only and are not intended to be limiting in any manner unless otherwise so specified.

EXAMPLE 1

5.5 g. of 2,6-diaminopyridine was dissolved in 125 ml. of acetone and 20 g. of triethylamine and 20 ml. of carbon bisulfide were added to the solution. The mixture was stirred at room temperature for 48 hours to precipitate 13.7 g. (yield 57.5%) of bis-(triethylammonium dithiocarbamate) having the following formula, which appeared as yellow crystals having a melting point (decomposition) of 110° C.

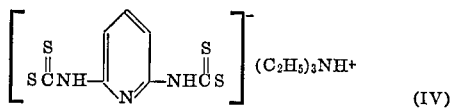

(IV)

The following decomposition reaction was easily carried out by heating an alcohol solution of the product

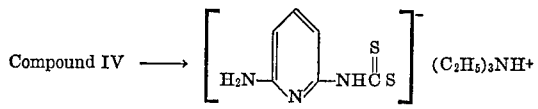

The resulting mono(triethylammonium dithiocarbamate) are crystals having a melting point (decomposition) of 97–98° C. and having an infrared absorption band at 1625 cm.⁻¹. Accordingly, the latter compound can be identified from the former Compound IV. 18.5 g. of the Compound IV was suspended in 300 ml. of methanol and 12 g. of methyliodide was added thereto. The mixture was stirred at room temperature. Crystals were precipitated from the solution. After 2 hours reaction, methanol was distilled off and the product was washed with water and benzene to obtain 10.1 g. (yield 87%) of the following compound having the Formula IIa (Compound II, R=CH₃). When the Compound IIa was recrystallized from acetone, crystals having a melting point of 130.5–131° C. was obtained.

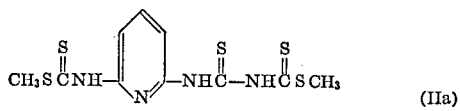

(IIa)

Elementary analysis (C₉H₁₁N₃S₄):—Calculated value (percent) C, 37.33; H, 3.83; N, 14.51. Analyzed value (percent: C, 37.37; H, 3.91; N, 14.51.

When the Compound IV was reacted with ethylbromide by heating to 40° C. to achieve S-alkylation, the following compound having the Formula IIb (Compound II, R=C₂H₅), which had a melting point of 93–94° C. was obtained:

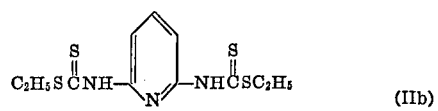

(IIb)

Elementary analysis (C₁₁H₁₅N₃S₄).—Calculated value (percent): C, 41.61; H, 4.76; N, 13.24; S, 40.39. Analyzed value (percent): C, 41.71; H, 4.74; N, 13.40; S, 40.23

290 g. of bis(methyl dithiocarbamate) derivative (IIa) was dissolved in 10 ml. of methanol and 2 ml. of 30% methylamine aqueous solution was added and maintained overnight to precipitate crystals. When the product was recrystallized from methanol, 245 mg. (yield 95.7%) of thiourea derivative having the following formula, which had a melting point (decomposition) of 225° C. was obtained.

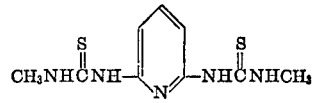

Elementary analysis (C₉H₁₃N₅S₂).—Calculated value (percent): C, 42.43; H, 5.13; N, 27.43; S, 25.11. Analyzed value (percent): C, 42.47; H, 4.99; N, 27.37; S, 25.46.

EXAMPLE 2

200 mg. of bis(ethyl dithiocarbamate) derivative (IIb) was reacted with 1 ml. of 30% methylamine aqueous solution in methanol at room temperature overnight, to obtain a thiourea derivative having the following formula, in a yield of 99%:

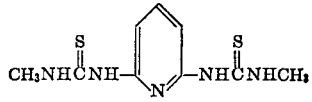

EXAMPLE 3

290 mg. of bis(methyl dithiocarbamate) derivative (IIa), 0.4 ml. of ethanolamine, and 10 ml. of methanol were heated at the reflux temperature for 2 hours, to obtain 300 mg. (yield 95%) of thiourea derivative having the following formula, which had a melting point (decomposition) of 149–150° C.:

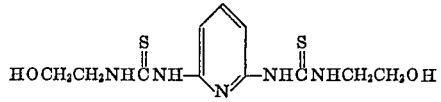

Elementary analysis (C₁₁H₁₇N₅O₂S₂).—Calculated value (percent): C, 41.88; H, 5.48; N, 22.50; S, 20.33. Analyzed value (percent): C, 41.97; H, 5.66; N, 22.43; S, 20.26.

EXAMPLE 4

290 mg. of bis(methyl dithiocarbamate) of the Formula IIa and 2 ml. of 40% dimethylamine aqueous solution and 2 ml. of methanol were mixed and maintained at room temperature overnight, and then the mixture was heated for 2 hours, to obtain 280 mg. (yield 99%) of thiourea derivative having the following formula. This compound was found to have a melting point of 171–172° C.

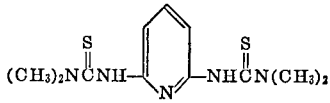

Elementary analysis (C₁₁H₁₇N₅S₂).—Calculated value (percent): C, 46.60; H, 6.04; N, 24.71; S, 22.62. Analyzed value (percent): C, 46.67; H, 6.08; N, 24.75; S, 22.74.

EXAMPLE 5

290 mg. of bis(methyl dithiocarbamate) derivative, 0.4 ml. of piperidine and 10 ml. of methanol were mixed and kept at room temperature overnight, and then the mixture was heated for 2 hours, to obtain 360 mg. (yield 99%) of thiourea derivative having the following formula. The compound which was recrystallized from benzene has a melting point of 175–176° C.:

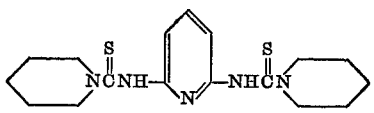

Elementary analysis ($C_{17}H_{25}N_5S_2$).—Calculated value (percent): C, 56.18; H, 6.93; N, 19.26; S, 17.64. Analyzed value (percent): C, 56.32; H, 6.92; N, 19.43; S, 17.65.

EXAMPLE 6

290 mg. of bis(methyl dithiocarbamate) derivative having the Formula IIa, 2 ml. of 28% ammonium hydroxide aqueous solution and 10 ml. of methanol were mixed and maintained at room temperature overnight, and then the mixture was heated for 2 hours, to obtain 220 mg. (yield 97%) of a thiourea derivative having the following formula, which had a melting point (decomposition) of 255–256° C.:

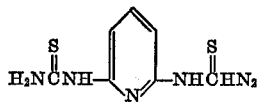

Elementary analysis ($C_7H_9N_5S_2$).—Calculated value (percent): C, 36.98; H, 3.99; S, 28.21. Analyzed value (percent): C, 36.43; H, 4.25; S, 28.48.

EXAMPLE 7

5.3 g. of 2,6-di(isothiocyanato) pyridine was mixed with 200 ml. of 15% dimethylamine aqueous solution and was stirred for 1 hour. The reaction mixture was dried under reduced pressure, and the residual product was washed with water and extracted with ethyl acetate, and the extract was concentrated and the product was recrystallized from methanol or ethyl acetate, to obtain 6.3 g. of pyridyl thiourea derivative having the following formula which appeared as crystals having a melting point of 171–172° C.:

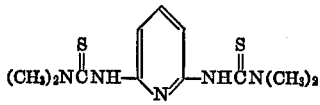

Elementary analysis ($C_{11}H_{17}N_5S_2$).—Calculated value (percent): C, 46.60; H, 6.04; N, 24.40; S, 22.60. Analyzed value (percent): C, 46.68%; H, 6.04; N, 24.71.

2,6-di(isocyanato) pyridine was prepared by mixing 5.5 g. of 2,6-diaminopyridine, 6.1 g. of carbon bisulfide, 11 g. of triethylamine and 25 ml. of ethanol at room temperature for 48 hours while stirring.

At the beginning of the reaction, the 2,6-diaminopyridine was insoluble but gradually dissolved to form a transparent solution, after which yellow crystals were precipitated. After the reaction, the crystals were filtered and washed with acetone and dried to yield 14.35 g. of bis(triethylammonium dithiocarbamate) having a melting point (decomposition) of 95° C.

40 g. of the resulting dithiocarbamate was suspended in 300 ml. of dried toluene while stirring, and 172 ml. of 10% phosgene-toluene solution was added to said solution at 0° C. and the mixture was reacted at 0° C. for 1 hour and then further reacted at room temperature for 12 hours. The product was filtered and washed with benzene and water, to obtain 2,6-di(isothiocyanato) pyridine having a melting point (decomposition) of 159° C.

Having now fully described the invention, it will be apparent to one of ordinary skill in the art that many changes and modifications can be made thereto without departing from the spirit or scope of the invention as set forth herein. Accordingly,

What is claimed and desired to be secured by Letters Patent is:

1. A pyridyl thiourea derivative having the formula:

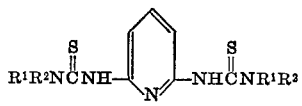

wherein $R^1$ and $R^2$, respectively, represent a hydrogen atom, a lower alkyl group or a hydroxyalkyl group or $R^1$ and $R^2$ taken together may form piperidine with the nitrogen ring.

2. The product of claim 1 which has the formula

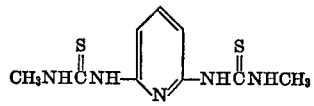

3. The product of claim 1 having the formula

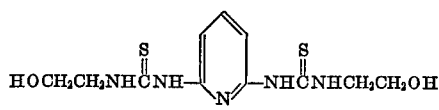

4. The product of claim 1 having the formula

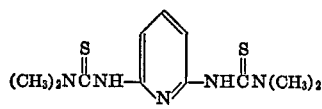

5. The product of claim 1 having the formula

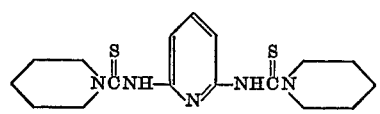

6. The product of claim 1 having the formula

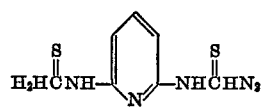

References Cited

Sidgwick, The Organic Chemistry of Nitrogen, Third Edition, Clarendon Press, Oxford, pp. 430–432 (1966), QD 181 N1 S5 C.2.

Smith, The Chemistry of Open Chain Organic Nitrogen Compounds, vol I, Benjamin Publishers, pp. 175–76 (1965), QD 412.N1 S6 C.4.

ALAN L. ROTMAN, Primary Examiner

260—294.8 E, 294.8 G; 424—263, 267